Dec. 8, 1931.  K. F. J. KIRSTEN  1,835,406
POWER TRANSMITTING MECHANISM
Filed May 16, 1922  3 Sheets-Sheet 1
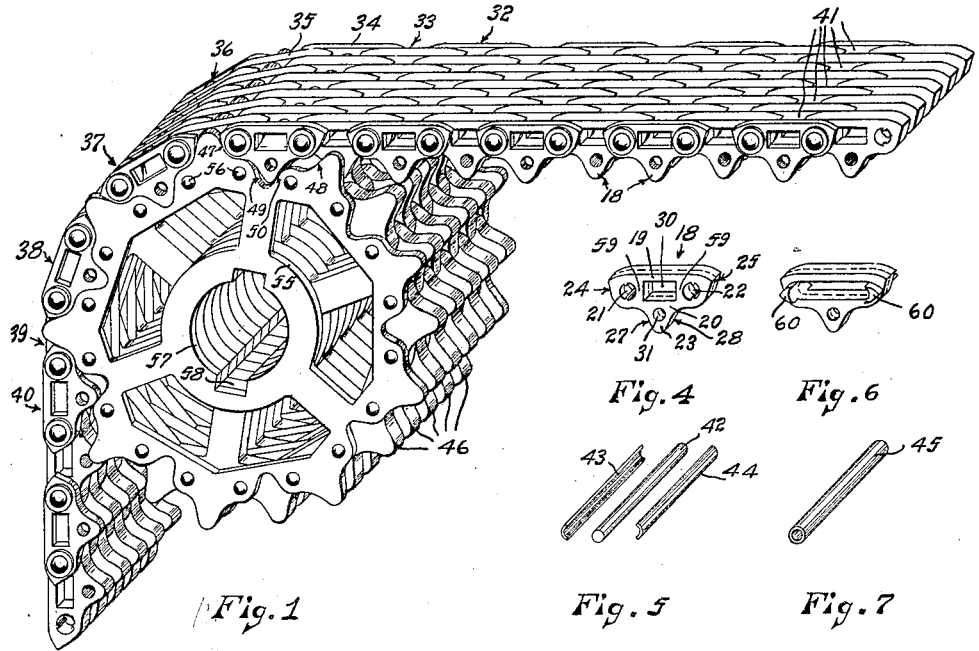
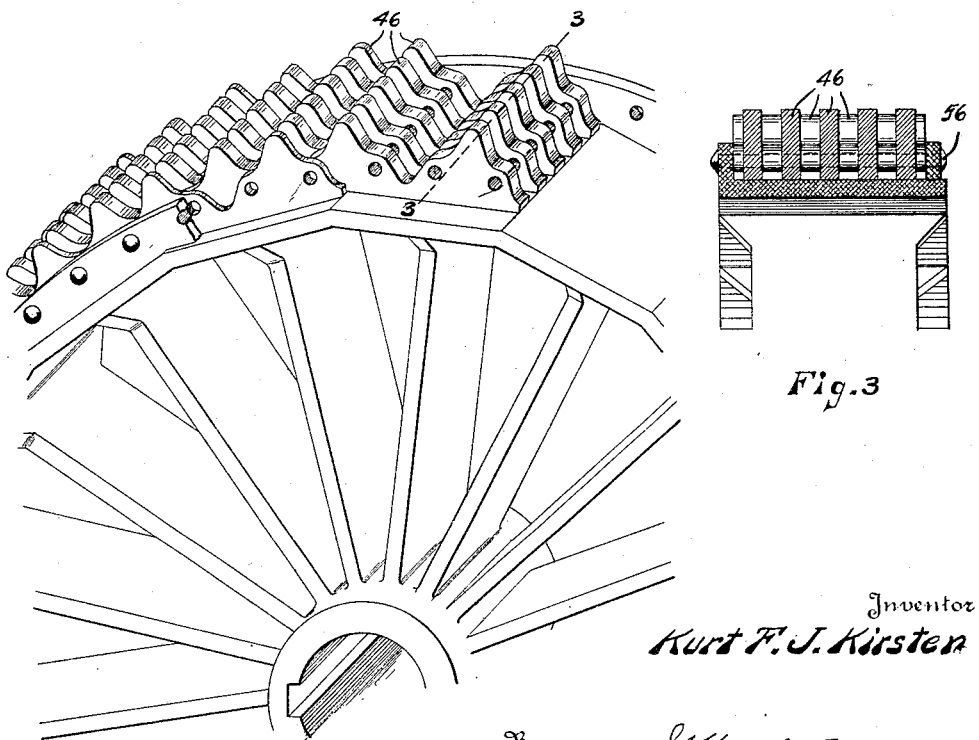
Inventor
Kurt F. J. Kirsten
By G. Wright Arnold
Attorney INVENTOR
Kurt F. J. Kirsten
BY
G. Wright Arnold
ATTORNEY Dec. 8, 1931.    K. F. J. KIRSTEN    1,835,406
POWER TRANSMITTING MECHANISM
Filed May 16, 1922    3 Sheets-Sheet 3

INVENTOR
*Kurt F. J. Kirsten*
BY
*G. Wright Arnold*
ATTORNEY

Patented Dec. 8, 1931

1,835,406

UNITED STATES PATENT OFFICE

KURT F. J. KIRSTEN, OF SEATTLE, WASHINGTON, ASSIGNOR TO THE KIRSTEN-BOEING ENGINEERING CO., OF SEATTLE, WASHINGTON, A CORPORATION OF WASHINGTON

POWER TRANSMITTING MECHANISM

Application filed May 16, 1922. Serial No. 561,544.

My invention relates to the art of power transmitting chains and cooperating sprockets.

In general, the fundamental conditions and requirements which must be met in using a metallic member, such as a chain, for the transmission of energy from one shaft to another are three in number and may be described as follows:

First: For maximum economy the material used in making up the chain links should be a minimum for the amount of tangential force which must exist for the given amount of energy to be transmitted;

Second: If the chain is made up of an assembly of links, the links should be connected by a member, (usually a pin) of minimum weight for given shearing stress. This member should also have a surface large enough to secure reasonable surface pressures to guarantee good wear; and Third: The contact surface between the chain and the sprockets, both driving and driven, should be a maximum in order to secure a distribution of the pressure upon maximum area which insures a maximum life of chain and sprockets and minimum wear of the parts in contact.

To briefly summarize, objections to chains as heretofore commonly designed obtain as follows: The improper distribution of the material as respects the line of tension; the lack of utilizing to the fullest advantage the material in the make-up of the links for bearing surface upon the sprocket from which it is to take or to which it is to impart energy; and the lack of adequate bearing surface provided along the pin axles upon which the links of the chain are assembled.

Chains heretofore used in power transmission may be grouped into two general types, i. e. chains wherein the teeth of the driving shaft bear upon or engage only the link members, and second, wherein the teeth engage the pin members. In short we have the link-tooth engaging type and the pin-tooth engaging type. The silent chain is a representation of the first type. The links are so assembled that the contact between the sprocket and the chain is brought about by a portion of the chain link surface. The pin inter-connecting the links is used only to transmit tension from one set of links to the adjoining set so that the working force upon the pin is purely a shearing force. The wear upon the pin by relative sliding contact is limited to the turning of one series of links with respect to the other as the chain passes around the cylindrical surface of the sprocket. The roller chains are a representation of the second type and are commonly used in bicycles. Herein, the links transmit only tensional stresses from one pin connection to the next, the wearing surface or surfaces of contact between the chain and the sprocket being limited to the surface of the connecting pin. In some cases the pin in this class carries a roller against which the sprocket engages instead of against the pin directly.

The chains of the first or link-tooth engaging type are designed to provide a bearing surface between the link and the sprocket which is entirely limited to the end of the link and all designs show that the sprocket tooth enters the chain between two adjacent chain pins so that the link is merely a mechanical bridge over the crown of the tooth from one bearing surface on one side of the tooth to the next following link. The material in the links is arranged so as to form a mechanical arch of high curvature between one tooth slot to the next following. This high curvature is necessary to provide a clearance between the link material and the top of the tooth of the sprocket. The pins are located at the base of this arch and when the chain is under tension, this arch tends to spread. In order to make the same stiff enough so as to prevent any excessive stretching of this arch, a great amount of material must be used in the make-up of the link to make the same stiff enough so that under ordinary working conditions the elastic limit of the material is never approached. Also, in order to provide a pin which will fit into the space between two adjacent sprocket teeth, the size of this pin is necessarily determined by the available space between the sprocket teeth and the amount of link material which is required for disposition about the pin hole of the link in order to make it mechanically strong to prevent the tearing of the pin out of its bearing hole. We find, therefore, that the designer is forced to coordinate the mechanical properties and the dimensions of the sprocket with the operating chain in such a way that the best design will be nothing more than a compromise of one feature, which is strength of the sprocket tooth, and the other feature, which is mechanical bulk of the link. If the conditions require a special design of chain link, the features of maximum economy within the narrow channels just described are adhered to by the designer in the use of the chain and sprocket material. A critical feature mechanically of these chains and of co-ordinating sprockets is an improper disposition or grouping of the link material about the line of tension which is from center to center of the chain pin. In this first type, the small diameter of the pin connecting a series of links together limits the bearing contact between the link and the sprocket tooth to but one surface element of the link in the extreme end of the link. If the link be subjected to great tensional force there exists a likelihood of the spreading of the links and as a consequence improper contact with the sprocket and on account of the small surface of the link in relative contact with the sprocket tooth surface, the width (therefore the weight for a given material) of the chain must be increased to meet the requirement of relative wear between the link and the sprocket tooth. The chain pins are usually too small in diameter to permit of the use of scientifically recognized proper normal bearing pressure between link and pin and as a consequence lubrication of these surfaces under extreme bearing pressures becomes problematic.

In the second or pin-tooth engaging type, the link itself performs only one function; namely, the transmission of tensional force. All other functions of relative wearing surface between chain and sprocket are taken care of by the pin and its roller. The mechanical defects of this chain are the burdening of the pin, not only with a surface of frictional contact between the sprocket and the chain, but also the frictional turning movement of adjacent links when the chain passes around the cylindrical surface of the sprocket. In order to secure reasonable bearing pressures so that lubrication is still possible on the surface in relative wearing contact, the link must be designed so thick that it contains more material than necessary to transmit the tensional forces. The action of the tooth upon the pin, either directly upon the pin or upon a roller carried by the link pin, places the small amount of material at the extreme end of the link always under a tensional force in contrast to a compressional force. The use of a roller in connection with the pin merely adds to the weight of the chain but is necessary as a spreader member to keep the links apart so as to make room for the sprocket teeth and adds to the expense of construction by making just that many more parts. It is found by practice that the first, or link-tooth engaging type, known as the "silent chain" made up of links cooperatively grouped together along the pivot pin without any space between them, can be constructed much lighter than the roller type chain for the same service.

The objects of my invention are in general to overcome these difficulties. A primary object of my invention is to provide a power transmitting mechanism wherein there is a minimum of material used for the amount of tangential force to be sustained for the given amount of energy to be transmitted. Another primary object is to provide a link of such form that it may utilize as a connecting member a pin of minimum weight for a given shearing stress and at the same time that such pin may be of a size as to provide sufficient bearing surface to distribute the pressure over a large area, thereby assuring good wearing qualities and avoidance of lubrication difficulties. Also, a primary object of my invention is to provide a chain link having the link material distributed in the form of beams on each side of the line of tension, that is, the line joining the centers of the pin holes. Another primary object of my invention is to provide a power transmitting mechanism having a link of such form that the size of the associated connecting pin and the amount of the material used in the link may be designed largely independent of the area of the tooth engaging surfaces. Furthermore, a primary object of my invention is to provide a link having the link material distributed in the form of beam members on each side of the line of tension between pin holes, and having a tooth engaging member carried by one of said beam members intermediate the pin holes.

Still a further primary object of my invention is to provide such a link having the said tooth engaging member of V form, preferably having broad faces, subtended from one of said beams, the line of tension in said tooth member being trained upon the centers of the connecting pins, or stating this in another way, the legs of said tooth member forming such angle with the supporting beam that the line of tension in each leg trains upon the centers of the connecting pins whereby an engagement of the link by the sprocket tooth is provided which maintains practically the same strain on the beam member not carrying the tooth as when not in engagement with the sprocket, that is, which avoids undue increasing the strains at any portion of the link.

Still another primary object is to provide such a link as may be used on a sprocket of any diameter provided only said sprockets have their teeth cut by a tooth cutter of the same magnitude. Again a primary object is to provide a power transmitting mechanism embodying a chain link and associated sprocket having tooth engaging faces distributed in a plurality of pitched circles. Also it is my purpose to eliminate the initial shock occurring when the tooth makes contact with the sprocket or gear and thereby provide a power transmitting mechanism which operates with a minimum of noise.

The above mentioned general objects of my invention together with others inherent in the same are attained by the mechanism illustrated in the following drawings, the same being merely preferred exemplary forms of embodiment of my invention, thruout which drawings like reference numerals indicate like parts:

Figure 1 is a view in perspective of a chain and sprocket in engaging position, embodying my invention;

Fig. 2 is a fragmentary view in perspective of a modified form of a sprocket wheel embodying my invention, consisting of a solid cast spider with teeth members assembled on machined faces of the periphery of said spider;

Fig. 3 is a view in section of the periphery on line 3, 3 of Fig. 2;

Fig. 4 is a view in perspective of a form of link of said chain, embodying my invention;

Fig. 5 is a view in perspective of one form of connecting pin, consisting of a solid pin and associated split sleeve;

Fig. 6 is a view in perspective of a modified form of a link embodying my invention;

Fig. 7 is a view in perspective of a hollow pin which may be used in connecting the links;

Figure 11:
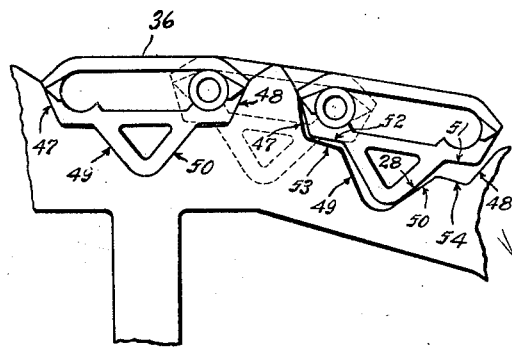
Fig. 11 is a fragmentary view of a sprocket and chain illustrating the preferred form of link in the process of making engagement with the faces of the sprocket teeth.
Figure 9:
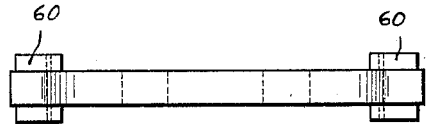
Fig. 9 is a plan view of the form of link shown in Fig. 8.

The chain part of my invention is formed of links 18 with the upper and lower beam-like members 19 and 20 having two pin holes 21 and 22 at each end thereof. The lower beam-like member 20 has a member 23 in general of a V-shape, centrally subtended intermediate said pin holes. The link is provided with two pairs of tooth engaging faces namely, one pair of faces 24 and 25 on each end of the link in one pitch circle 26 (see Fig. 8) and one pair of faces 27 and 28 on the V-shaped member 23 in another pitch circle 29 (see Fig. 8). Openings 30 and 31 are provided to lighten the weight of the chain and reduce the material required.

In making up the chain, the links are arranged in series 32, 33, 34, 35, 36, 37, 38, 39 and 40 across the width of the chain having openings 41 between the links. Pins 42 and associated split sleeve members 43 and 44 function to connect the links of each series and also to connect one series of links with the next succeeding series. A modified form of said connecting means is shown in Fig. 7, the same being a hollow pin 45.

The sprocket part of my invention is formed of circular plates or laminæ 46. The circumference of these plates is provided with teeth, having link engaging faces 47 and 48 forming one pair in pitch circle 26 and engaging faces 49 and 50 forming a second pair in pitch circle 29. That is, the contour of the teeth is such that they register or fit the links above described so that the links may be received into said plates, and the respective tooth-engaging faces of each, the link and the sprocket, and of both pitch circles may engage each other. Parts 51 and 52 of the link and parts 53 and 54 of the teeth do not make contact.

Openings 55 are provided to lighten and reduce the weight and material respectively of the sprocket. Pins 56 are provided to connect the plates or laminæ into one wheel, having an axle bearing 57 provided with grooves 58. These grooves serve to key the sprocket or driving wheels to the shaft (not shown) on which same is mounted and also serve in rendering easy the proper assembling of the plates or laminæ by causing a proper registration of the teeth of successive laminæ in turning successive lamina 180 degrees so that the apex of a tooth of one lamina registers with a valley of the tooth of the adjacent lamina.

Figure 8:
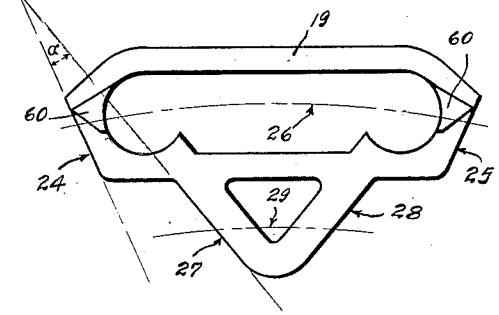
Fig. 8 is an enlarged view in side elevation of a preferred form of link embodying my invention diagrammatically showing the difference of inclination of the tooth engaging faces of the different pitch circles.
Figure 12:
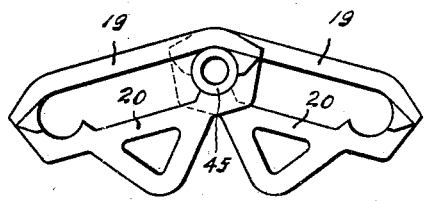
Fig. 12 is a view of two links of the preferred form shown in Fig. 8 in engaging position illustrating the action of said links about the connecting pin.
Figure 10:
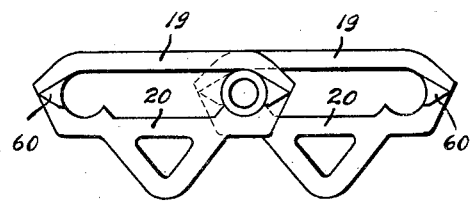
Fig. 10 is a view showing two links of the preferred form as shown in Fig. 8 in engaging position with a hollow pin as the link connecting means.
Figure 13:
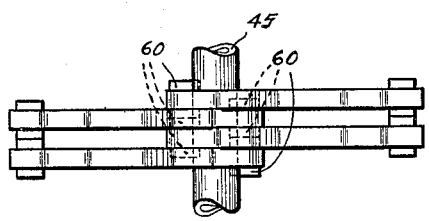
Fig. 13 is a plan view of the links shown in Fig. 12.
Figure 17:
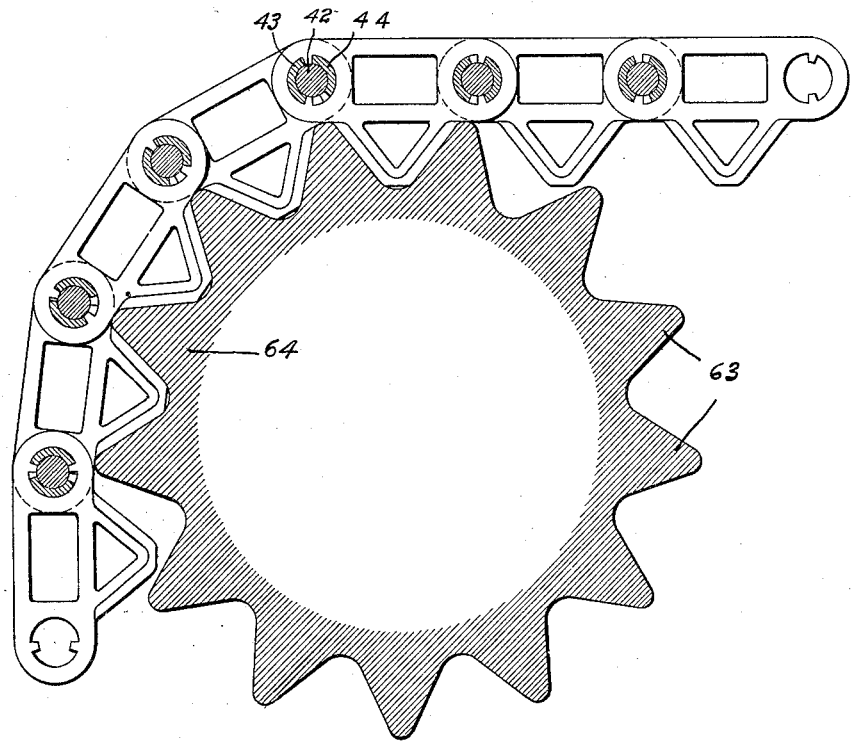
Fig. 17 is a view of a chain formed of said links as shown in Fig. 14 and a sprocket in engaging position.
Figure 14:
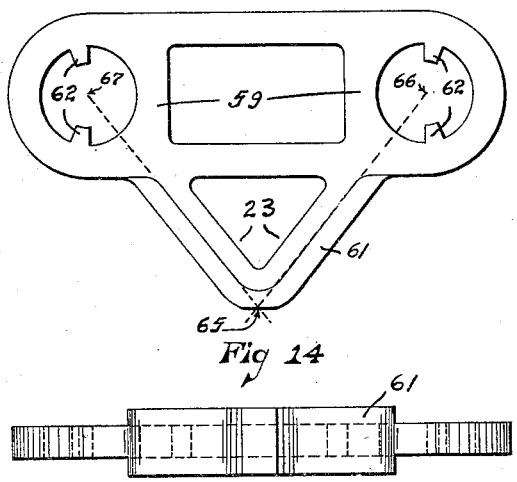
Fig. 14 is a view in side elevation of still another modified form of a link embodying my invention said link having its tooth engaging faces in one pitch circle.
Figure 15:
Fig. 15 is a plan view of the same.
Figure 16:
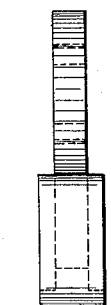
Fig. 16 is an end view of the same.

In Figs. 6 and 8 modified forms of links are shown wherein the end bracing members 59 are omitted. Each end of the link is provided with a projecting member 60 which functions to double the bearing on the connecting pin 45 making the same continuous over a large portion of the pin along two sides of the same. Also said projecting members serve to inter-connect the links both of the same and different series as appears clearly in Fig. 13. This form of link greatly reduces the weight of the material required and by the scientific disposition of the material in the form of a beam, makes possible a chain of very light weight without sacrificing strength and obviously the diameter of the pin may be made great or small as requirements of the specific use may dictate. The modified form shown in Fig. 14 has its V-shaped tooth member 23 provided with broad faces 61 and disposed in the one pitched circle 29. Blocking members 62 limit the movement of the sleeves 43 and 44 as appears in Fig. 17. The faces 61 engage the teeth 63 of the sprocket 64.

The mode of operation of a power transmission mechanism embodying my invention is as follows: The strain in the link when out of engagement with or apart from the sprocket is clearly tensional and confined to the beam-like members 19 and 20 and is transmitted in a straight line from one end to the other of the link, that is, from pin center to pin center of pin holes 21 and 22. Upon engaging the sprocket (Figs. 1 and 2), the face 28 of the link 18 (assuming the driving sprocket is turning counter-clockwise) engages first the face 50 of the tooth of the series 34 of the driving sprocket as the same revolves and the full driving power of the sprocket is transferred to the chain links. Contacting face 48, of the tooth, as the links reach the position of series 36, engages the end face 25 of the link in pitch circle 26 and changes part of the tensional strain in the link into a compressional strain. The link is then receiving the driving power upon both of its faces 28 and 25 from both of the faces 48 and 50 of the tooth of the driving sprocket. By providing for the contacting face 50 of the tooth to first engage the face 28 of the link in the inner pitch circle, there is manifestly a tendency to pull down the trailing-end portion of the link and thus bring it squarely into engagement with the contacting face 48 of the tooth in the outer pitch circle 26. Be it particularly noted that the flat inclination of the contacting faces 28 and 50 of the link and sprocket tooth respectively are specially adapted to facilitate the engagement of the two parts by a sliding movement, as it were, into final seating position and eliminates initial shock, which otherwise would obtain when the two members come into engagement.

By providing a plurality of the tooth engaging faces in different pitch circles, it is manifest that in my construction the size of the pin holes 21 and 22 for the connecting pin 42 or 45 is rendered independent of the magnitude of the engaging faces, and hence, the factors governing the designing of the pin may be entirely independent of the magnitude required for the contacting faces. Thus, there may be provided a large contacting face area so that the wearing surface may be well distributed and at the same time a small pin may be used if the strains of a particular use of the mechanism will permit.

The provision for contacting faces in different pitch circles for the link supplies a link of truss-like construction, that is, the material is so distributed as to provide for sustaining the maximum strains to which a given quantity of material may be subjected.

The projecting members 60 inter-connect the links and provide in effect a continuous bearing which distributes the pressure evenly along the connecting pin 45, thereby avoiding lubrication difficulties.

The inclination of the face 24 differs from that of the face 27 as clearly appears in Fig. 8—the said faces forming with each other the angle alpha. This provides for the gradual gripping of the chain link by the sprocket teeth and thus avoids the development of noise.

The dotted lines 65—67 (see Fig. 14) illustrate how the legs of the V-shaped tooth member 23 train upon or direct towards the center of the pin holes 21 and 22. This provides for keeping the strains directed upon the pins, resolving the tensional strain in beam member 20 into compressional forces acting in the direction of line 65—67 assuming the driving sprocket 64 is turning clockwise. Obviously, a chain formed of links of the form illustrated in Fig. 14 may be used on sprockets differing in diameter provided the teeth are cut with a tooth cutter of the same magnitude.

Obviously, changes may be made in the forms, dimensions, and arrangement of the parts of my invention, without departing from the principle thereof, the above setting forth only preferred forms of embodiment.

I claim:

1. A power transmitting mechanism embodying a link formed of upper and lower beam-like members, said link being provided with a pin bearing opening in each end of said link; leg members, each having a power transmitting engaging face thereon, said members being subtended in a V form from the lower beam member in the plane of said link, the longitudinal axis of said members being trained upon the centers of the pin openings, whereby said link provides maximum stress for minimum weight having members which lie only in line of stresses; and a sprocket having V shaped grooves corresponding to the said V shaped leg members, whereby said faces of said leg members are in contact substantially throughout their length, whereby bending moments in any part of said length are eliminated at all times when engaged by said sprocket.

2. In combination with a power transmitting mechanism, a chain embodying a link having its tooth engaging faces in a plurality of pitch circles, the planes of said engaging faces forming an acute angle therebetween.

3. In combination with a power transmitting mechanism, a chain embodying a link having pin holes in each end portion, and a plurality of tooth engaging faces on both sides of a line drawn through the center of and at right angles to the line joining said pin holes, the planes of said engaging faces forming an acute angle therebetween.

4. In combination with a power transmitting mechanism, a chain embodying a link having pin holes in each end portion and a plurality of tooth engaging faces on both sides of a line drawn through the center of and at right angles to the line joining said pin holes, said faces on each side being in different pitch circles and the inclination of the faces in one circle being greater than in the other.

5. A power transmitting mechanism embodying a link, provided with a pin opening in each end of said link, tooth engaging end faces adjacent to said openings, a V-shaped member centrally subtended intermediate said openings, and tooth-engaging faces on each side of said V-shaped member, said faces being in a different pitch circle than said first mentioned tooth engaging end faces, whereby may be provided strength of link which may be designed independent of the area of the tooth engaging faces.

6. A power transmitting mechanism embodying a link, provided with a pin opening in each end of said link, tooth engaging end faces adjacent to said openings, a V-shaped member centrally subtended intermediate said openings, and tooth-engaging end faces on each side of said V-shaped member whereby may be provided strength of link which may be designed independent of the area of the tooth engaging faces, and a co-operating sprocket having double pitched teeth whereby contact may be made with the tooth engaging surfaces of said link.

7. A power transmitting mechanism embodying a link, having a link pin opening in each end thereof, a V-shaped member subtended intermediate said link pin openings and having four tooth engaging faces, two of which are disposed on the ends of said link (one at each end) and one on each side of said subtended V-shaped member, the tooth engaging faces on the ends being of a different inclination from that of the faces on the V-shaped member.

8. In combination with a power transmitting mechanism, a sprocket composed of circular laminations provided with teeth on their peripheries, chain engaging faces on said teeth, said faces being located in a plurality of pitched circles.

9. In combination with a power transmitting mechanism, a sprocket composed of laminated members provided with teeth on their peripheries, chain engaging faces on said teeth, said faces being located in a plurality of pitched circles, whereby said faces may register with link faces located adjacent the link pins and with the V faces subtended from the portion of the link intermediate the pins.

In witness whereof, I hereunto subscribe my name this 10th day of May, A. D. 1922.

KURT F. J. KIRSTEN.